June 19, 1956 L. H. SKROMME ET AL 2,750,729
RAKE BAR BEARING
Filed April 5, 1952 2 Sheets-Sheet 1
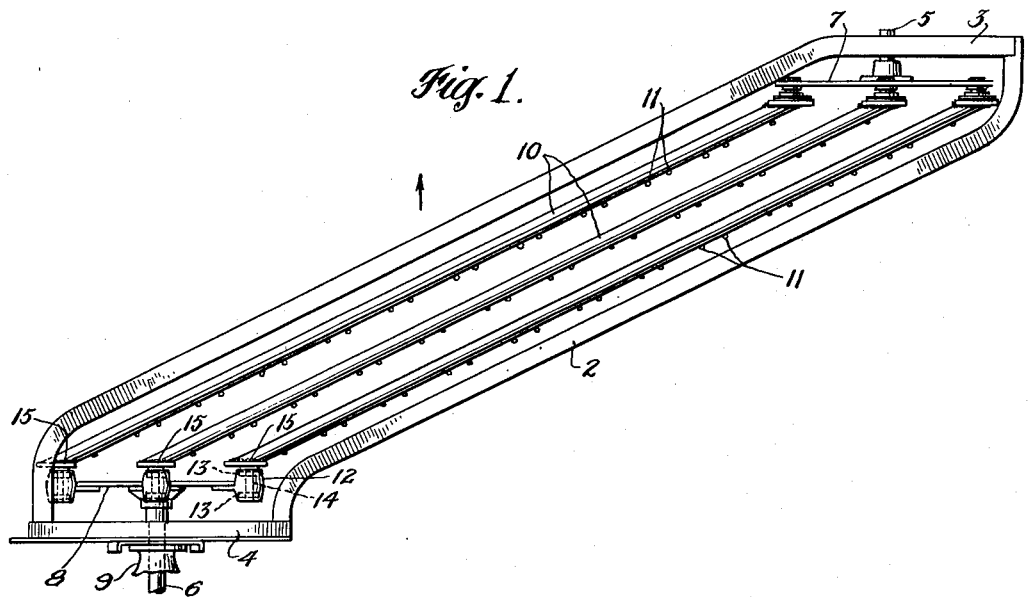
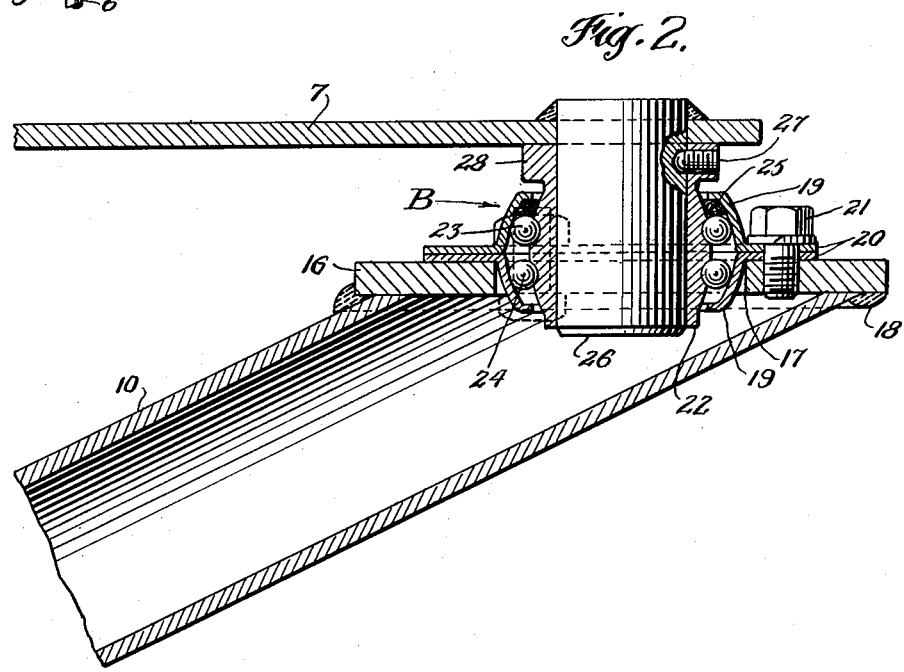
Inventors
Lawrence H. Skromme
Melvin J. Happe
Richard E. Babcock Jr.
By
Attorney

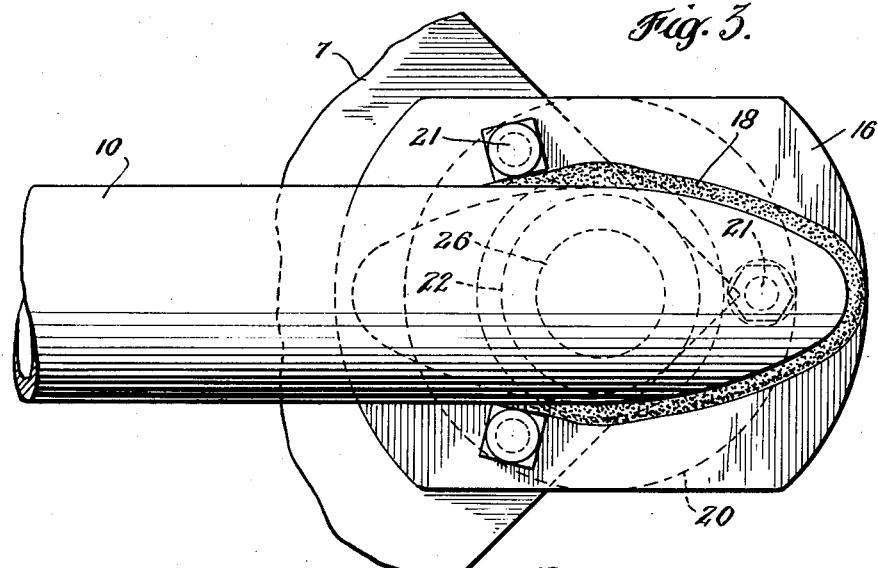
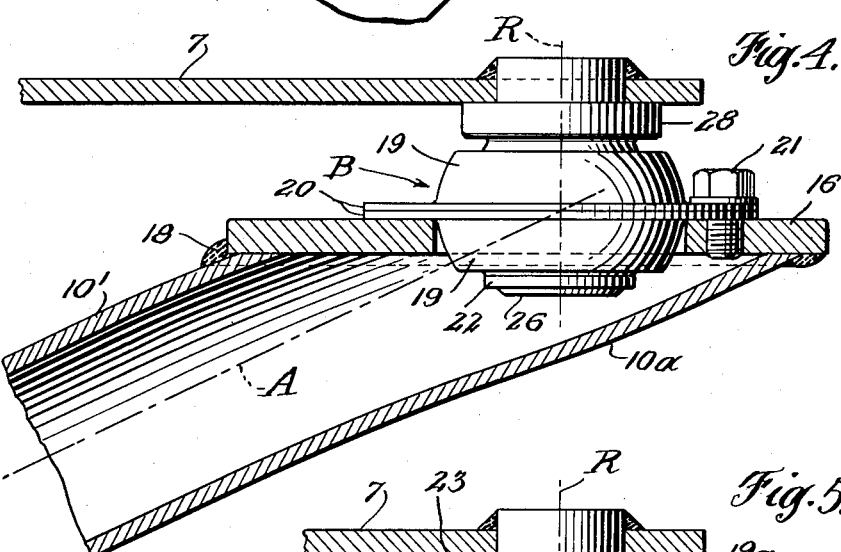
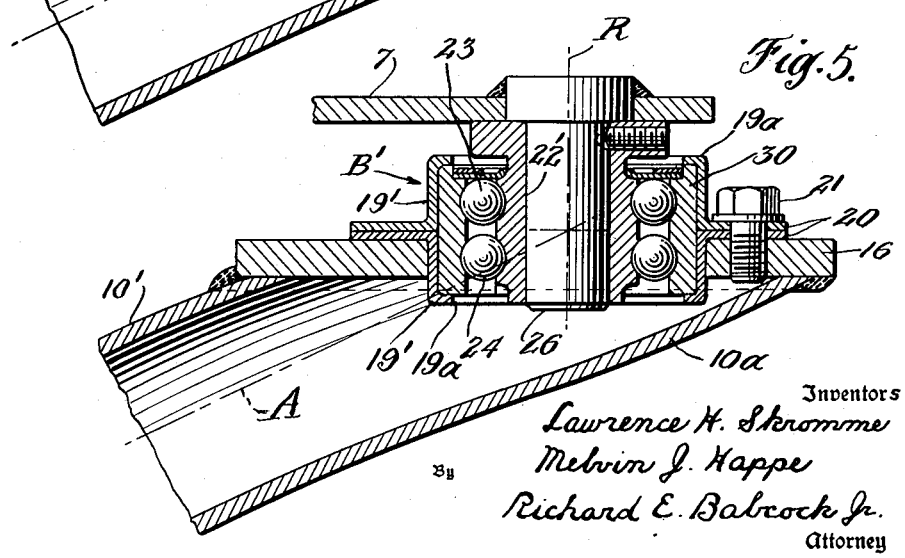

United States Patent Office 2,750,729
Patented June 19, 1956

2,750,729

RAKE BAR BEARING

Lawrence H. Skromme, Manheim Township, near Lancaster, and Melvin J. Happe, New Holland, Pa., assignors, by mesne assignments, to Sperry Rand Corporation, a corporation of Delaware Application April 5, 1952, Serial No. 280,752

1 Claim. (Cl. 56—377)

This invention relates to a side delivery hay rake of the well known roller bar reel type, as exemplified in the W. E. Martin U. S. Patent 818,899 of April 24, 1906, and more particularly to the means for mounting the roller bars in the reel of a rake of this type.

While side delivery rakes of the roller bar reel type have been satisfactory in many respects, the bearing means for coupling the roller bars to their supporting reel spiders have been subjected to rapid wear, due in part to tendency of foreign material to enter and deteriorate the bearings, and also due in part to the twisting forces imposed on the bearings during operation of the rake and tending to cause brinelling.

The twisting forces are produced partly by the weight of the respective bars, which are normally supported at a location axially spaced from the bearing centers, and to a larger extent by the operative engagement (hereinafter referred to simply as ground engagement) of the rake tines with the hay and/or the ground. The combined moments of force transmitted to each bar through its several tines creates a substantial torque on the rake bar tending to twist it about its supporting bearings, or in other words to swing the axes of the bearings. The magnitude of the twisting moment exerted on the bearings will obviously increase with the distance between the free ends of the rake tines and a line extending between the centers of the respective bearings.

With the above considerations in mind, it is an important object of the invention to reduce to a minimum the twisting forces to which the bearings are subjected. We have found that this may be accomplished by supporting each rake bar in such a position that its major axis intersects the axis of its supporting bearings in or closely adjacent the center or central radial plane of the bearing. We thus eliminate that portion of the twisting force which results from the weight of the bar and reduce to a minimum the twisting movement caused by ground engagement.

Moreover, due to maintaining the twisting forces on the bearings at a minimum, our invention renders practicable the use of but a single bearing at each end of the rake bar, in lieu of the two axially spaced bearings such as were formerly required to successfully resist the twisting forces transmitted through the rake bar.

It is a further important object of the invention to utilize the rake bar for housing or closing off and shielding one end of the bearing to prevent the entry of foreign matter thereinto. This not only provides an efficient, economical and compact arrangement, but in addition eliminates the necessity for a separate shielding or sealing means at the end of the bearing.

The foregoing as well as other incidental objects and advantages are attained by the several embodiments of the invention illustrated in the accompanying drawings, in which:

Figure 1 represents a plan view of a roller bar type side delivery rake reel assembly embodying a preferred form of our invention;

Figure 2, an enlarged fragmentary horizontal section looking downwardly through the major axis of one of the rake bars in Figure 1;

Figure 3, a front elevation of the mechanism shown in Figure 2;

Figure 4, a view similar to Figure 2 (but with the bearing structure shown in plan) illustrating a modified form of the invention;

Figure 5, a view similar to Figure 2 illustrating another modified form of the invention.

Referring now in detail to the accompanying drawings, there is shown in Figure 1 a rigid rake basket 2 of the type which is customarily supported for ground traversing movement on a wheeled rake frame with the major dimension of the basket 2 extending diagonally to the direction of ground traversing movement, indicated by the arrow in Figure 1.

Rotatably journalled in the forward and rear ends 3 and 4 respectively of the basket are parallel horizontal shafts 5 and 6 which support the end plates or spiders 7 and 8 at the opposite ends of the raking reel. The rearmost shaft 6 is received in a gear box 9 (shown fragmentarily) through which it is driven by any suitable or conventional means.

Extending diagonally between the respective spiders 7 and 8 are the usual roller bars 10, each supporting a series of downwardly directed rake tines 11, the arrangement being such that rotation of the reel during ground traversing movement of the rake causes the rake bars 10 to successively engage the hay by means of their tines 11 and form the hay into a windrow extending from the rearmost or driven end of the reel.

In the arrangement shown in Figure 1 the ends of the respective rake bars 10 are coupled to and rotatably supported on the rearmost or driven reel spider 8 in a more or less conventional manner. As thus arranged, bearing housings 12 on the spider 8 each enclose relatively axially spaced bearings 13 in each of which is rotatably supported a spindle 14 extending diagonally from the adjacent end of one of the rake bars 10. It will be seen that each spindle 14 is fixed to a flat plate 15 which is welded flush against the diagonally cut end of its respective rake bar. The two relatively spaced bearings 13—13 in each housing 12 will function in accordance with usual practice to firmly resist the above mentioned twisting forces transmitted through the respective rake bars and caused by the ground engagement of the bars as well as by the weight thereof.

In this embodiment, substantially the entire burden of resisting the twisting forces on the bars 10 is borne by the bearings 13 and pintles 14 at the rear end of the reel, while self-aligning ball bearings B are employed at the forward end of the reel to support the respective bars 10 on the spider in the manner illustrated in detail in Figure 2. It will be seen that each rake bar 10, which is of tubular metal construction, has its forward end cut or disposed in a diagonal plane parallel to the adjacent spider 7 and its plane of rotation. A flat mounting plate 16, provided with a medial aperture 17 communicating with the interior of the tubular bar 10, is secured over and flush against the end of bar 10, as by welding 18.

A conventional self-aligning spherical ball bearing B is secured on the plate 16 with an axial end of the bearing projecting through the aperture 17 to be housed within the end of the tubular rake bar 10 and thereby shielded from dirt or foreign matter.

To this end, the bearing housing, which functions also as the outer ball race, comprises complementary sections 19—19 having abutting radial flanges 20 secured flush against each other at the central radial plane of the bearing, these flanges 20 being secured flush against the plate 16 around the aperture 17, as by means of bolts 21. One of the housing sections 19 is thus received in the aperture 17 and the end of the bar 10 and the flanges 20 seal the aperture against entry of foreign matter.

The inner ball race 22 is provided with relatively axially spaced annular grooves within which are guided two rows of balls 23 and 24 respectively cooperating with the outer race members 19 on opposite sides of the central radial plane of the bearing. A conventional seal or packing 25 may be operatively disposed in the outer bearing housing section to prevent foreign matter from entering the bearing, however such a seal may be omitted from the inner end of the bearing which is housed within and shielded against foreign matter by the tubular rake bar 10.

A stud or stub shaft 26 rigidly fixed on the spider 7 exemplifies one of the several possible ways of operatively mounting the inner race 22 on the spider 7, the inner race being disposed axially on the stud 26 and secured against axial and rotary movement by means such as a set screw 27 threaded through a collar 28 formed integrally on the inner race externally of the housing on the side thereof adjacent the spider 7.

In the foregoing combination it will be apparent that there is provided an accurate, economical and nevertheless quite simple way of mounting the bearing with its rotational axis at the desired diagonal angle to the major axis of the roller bar 10. Moreover, it will be seen that this arrangement, by projecting the bearing into the interior of the bar 10, permits the major axis of the bar 10 to intersect the bearing axis at a point which will obviously be located closely adjacent the center or central radial plane of the bearing midway between the two rows of balls 23—24. Thus the twisting forces transmitted to the bearing and tending to change its axis of rotation will be maintained near a minimum, with consequently reduced wear on the bearing. However, the self-aligning feature of the bearing will permit it to compensate for any inaccuracies in the angular positions of either the plate 16 or stud shaft 26.

In the modification shown in Figure 4, the construction and arrangement is the same in all respects as above described, except that the end of the bar 10' adjacent the bearing B is bent or bowed slightly as shown, to displace the major axis A of the bar toward the spider 7 sufficiently that the said axis intersects the rotational axis R of the bearing exactly at the center or central radial plane of the bearing, which in this embodiment coincides with a plane extending between the flanges 20—20 of the bearing housing and midway between the two rows of balls therein. It will be noted that the end portion of the bar 10' is bent or flared outwardly, as at 10a, to provide ample clearance for the adjacent end of the bearing.

In the modification shown in Figure 5 there is shown an arrangement similar to Figure 4 but employing a bearing of the type having a fixed alignment and thus capable of use at both ends of a rake reel to resist the twisting forces on the rake bar 10 and maintain the latter in a fixed rotational position relative to the ground at all times, as is required in a rake of this type.

In this bearing, the inner race 22' and outer race 30 have relatively opposed annular grooves within which are guided two rows of balls 23—24. The bearing housing comprises a pair of complementary cylindrical members 19' connected by abutting radial flanges 20' along the medial radial plane of the bearing. These members are formed separately from the outer race 30 and have inturned marginal flanges 19a—19a at the opposite ends of the housing to axially position the outer race 22', and any twisting forces on the bar 10 tending to change or swing this axis will, if of sufficient magnitude, tend to cause brinelling of the bearing. It is therefore of particular importance to maintain such twisting forces at a minimum in a bearing of this type in order to prolong the useful life of the bearing.

By virtue of the apertured plate 16, and by slightly bending or off-setting the end of the bar 10', substantially as in Figure 4, it is possible to cause intersection of the axes A and R respectively at the center of the bearing midway between the two rows of balls 23—24, thus attaining the desired minimizing of the twisting forces.

It is of particular importance to note that, due to this specific location of the axis intersection, any twisting force that might otherwise result from the weight of the roller bar 10 is completely eliminated, while the twisting forces resulting from ground engagement of the roller bar is maintained at a minimum.

Thus, by the present invention the strain on the bearing is reduced to a point such that it is made practicable to use but a single bearing B' at each end of the rake bar 10 in place of the two relatively axially spaced bearings (exemplified by the bearings 13—13 in Figure 1) which were heretofore required to support each end of the rake bars in conventional roller bar type side delivery rakes.

In this application we show and describe preferred embodiments of our invention, simply by way of illustration of the practice of the invention as by law required. However, we recognize that the invention is capable of other and different embodiments and that its several details may be modified in various ways, all without departing from the invention. Accordingly, the drawings and description herein are to be considered as merely illustrative in nature and not as exclusive.

Having thus described our invention, we claim:

In a side delivery hay rake of the roller bar reel type, the combination of a rotatable member supported for rotation about a fixed axis, a tubular bar extending diagonally to said axis, said bar having a face which extends parallel to the rotational plane of said member, and means connecting said bar to said member at a point spaced from said axis, said means comprising a stud shaft one end of which is fixed to said member, said stud projecting outwardly of said member in a direction parallel to the said axis, a plate rigidly secured to said face of said bar, said plate having an aperture through which the end of said shaft opposite said one end projects, the diameter of said aperture being greater than the diameter of said shaft, a bearing including a housing therefor fixedly mounted on said shaft and interposed between said shaft and said plate, one axial end of said bearing and its surrounding housing portion extending through said aperture and into said bar, means rigidly connecting said bearing housing to said plate, the location of said bearing being such that its center is approximate to the point of intersection of the axis of said stud shaft and the axis of said tubular bar.

References Cited in the file of this patent

UNITED STATES PATENTS

| | | |
|---|---|---|
| 818,899 | Martin | Apr. 24, 1906 |
| 935,456 | Blackstone et al. | Sept. 28, 1909 |
| 1,898,334 | Baker | Feb. 21, 1933 |
| 1,957,002 | Searles | Mar. 1, 1934 |
| 2,040,692 | Hitchcock | May 12, 1936 |
| 2,603,933 | Shore | July 22, 1952 |
| 2,621,465 | Klemm | Dec. 16, 1952 |